United States Patent Office 3,302,173
Patented Jan. 31, 1967

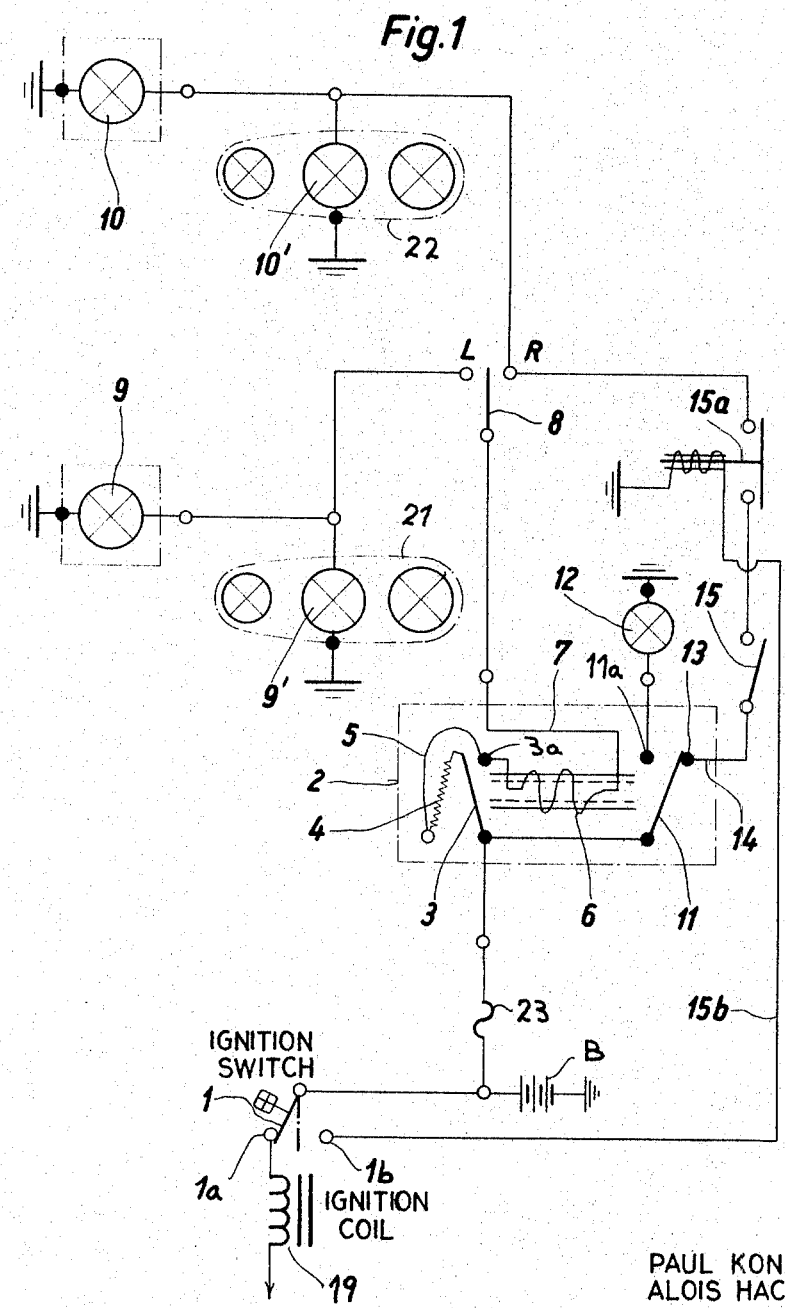

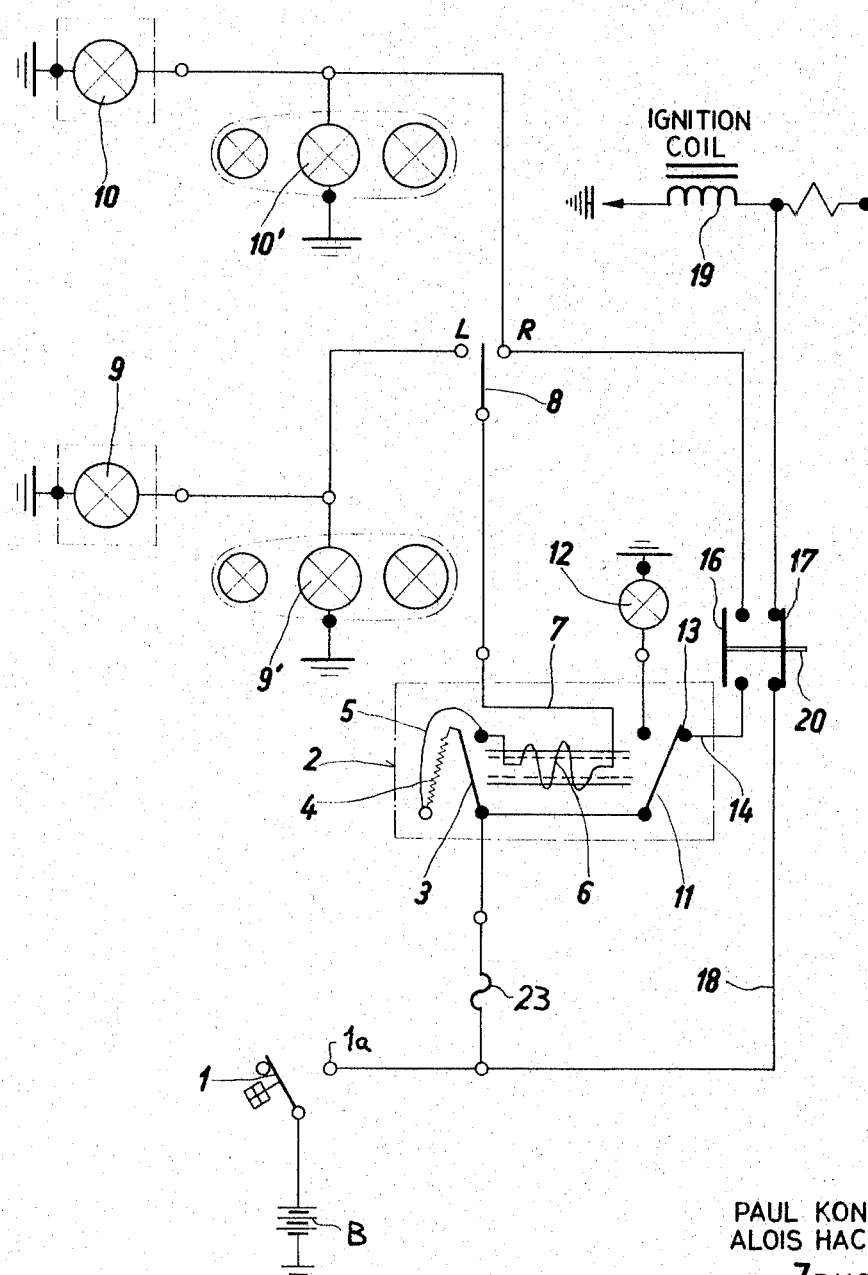

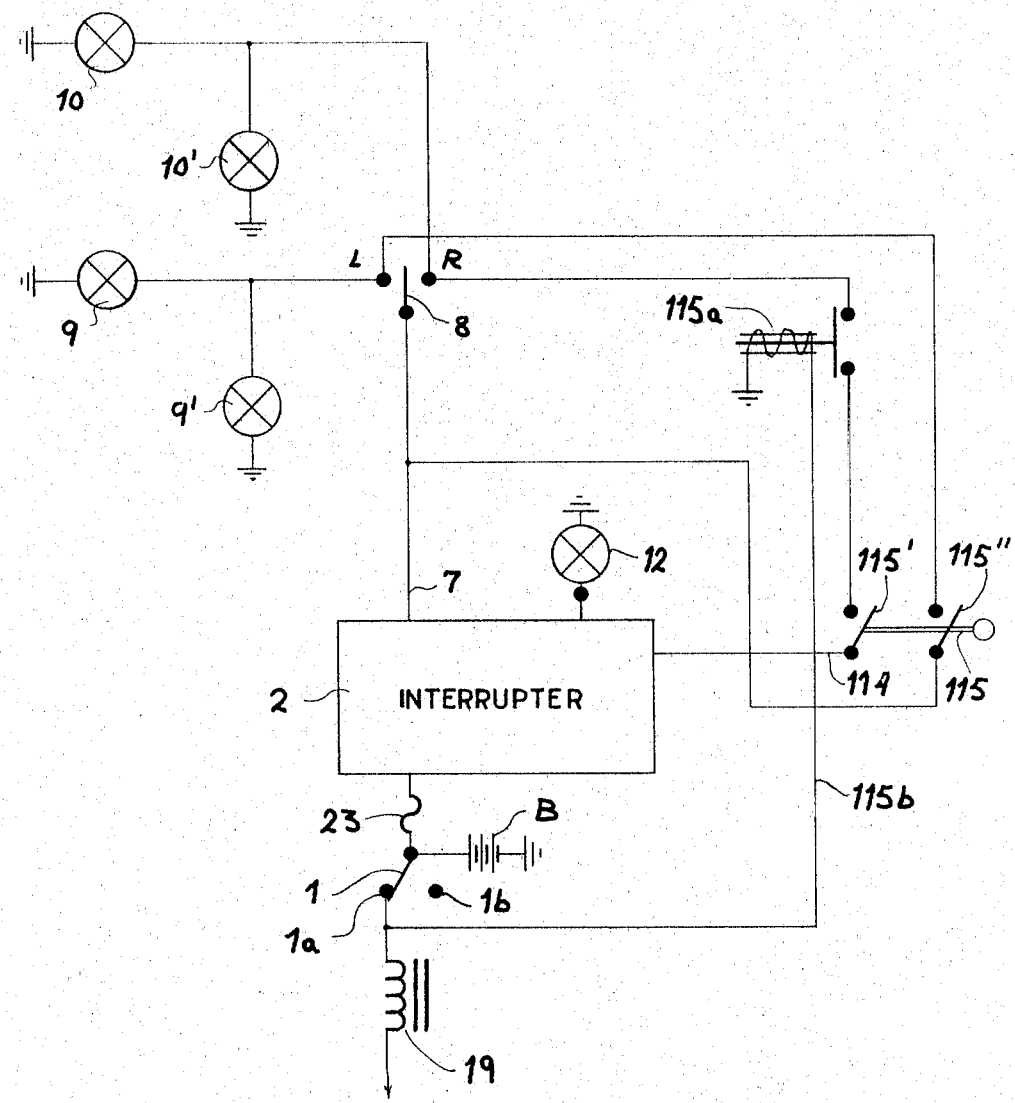

3,302,173
VEHICULAR SIGNALING SYSTEM
Paul Konz and Alois Hackner, Ingolstadt (Danube), Germany, assignors to Auto Union G.m.b.H., Ingolstadt (Danube), Germany, a corporation of Germany
Filed June 3, 1963, Ser. No. 284,979
6 Claims. (Cl. 340—81)

Our present invention relates to a signaling system for automotive vehicles and the like including directional lights of the conventional blinking type.

The general object of this invention is to provide a system for utilizing such blinker lights as emergency signals to indicate a stalled car on the road and/or to attract the attention of the authorities.

A more particular object of our invention is to provide switchover means for converting a conventional blinker system into an emergency signaling system wherein the directional lights on opposite sides of the vehicle blink alternately to indicate an abnormal condition.

It is also an important object of this invention to provide protective means for insuring that the emergency lighting is not inadvertently turned on in place of a directional signal during the normal operation of a vehicle.

Our invention realizes the foregoing objects by the provision of an otherwise conventional battery signaling system, including the usual selector switch for intermittently energizing one or the other directional light, having means for periodically closing an alternate energizing circuit for one of the directional lights in a position of the selector switch in which the other directional light is intermittently operated, the periodic closure of the alternate circuit being carried out under the control of an interrupter in series with the selector switch with the aid of contacts adapted to energize the first directional light when the second directional light is de-energized and vice versa; the alternate circuit also includes, advantageously, normally open contacts which are closable under the control of the driver only with concurrent deactivation of the ignition coil or equivalent means required to keep the vehicular engine in motion. In particular, the normally open contacts in the alternate or emergency circuit could be the make or the break contacts of a relay controlled by the ignition switch or could be mechanically coupled with a set of normally closed contacts, inserted in the energizing circuit for the ignition coil, so that the last-mentioned contacts must be opened when the emergency circuit is manually closed.

The invention will be described hereafter in greater detail with reference to the accompanying drawing in which FIGS. 1 and 2 are two circuit diagrams of respective embodiments, FIG. 3 showing a partial modification of FIG. 1.

In FIG. 1 we have shown part of the electrical circuitry of an automotive vehicle whose power source (i.e. the usual generator-and-accumulator combination) has been symbolized by a battery B. The key-operated ignition switch on the dashboard of the vehicle is indicated at 1. The vehicle is equipped with conventional signal lights 9 (left) and 10 (right) in the front as well as 9' (left) and 10' (right) in the rear, the lights 9' and 10' being disposed in common mountings 21, 22 together with further conventional lamps (e.g. stop and reversing lights) which are of no further interest in connection with the present invention. The left-hand lights 9, 9' and the right-hand lights 10, 10' are alternately energizable via respective contacts L and R selectively engageable by a manual switch 8 which in the known manner may be installed on the steering column of the vehicle; switch armature 8 is connected to power source B through an interrupter 2 in series with a fuse 23.

The interrupter 2 comprises a thermal relay formed by a contact spring 3, a high-resistance wire 4 of large thermal coefficient of expansion and a lead 5 connecting the resistance wire 4 to a bank contact 3a engageable by a spring 3. Normally, i.e. with the wire 4 in its cold state, this wire holds the spring 3 out of engagement with contact 3a; a relay coil 6 is connected between contact 3a and armature 8 by way of a conductor 7. An armature 11 controlled by the relay coil 6, when attracted by this coil, engages a make contact 11a to energize a monitoring lamp 12 on the dashboard; normally, the armature 11 rests against its back contact 13.

The ignition switch 1 is shown to be of the usual construction with a central position (dot-dash lines), in which the system is open-circuited and the key may be withdrawn or inserted; an operative position on a working contact 1a in which the ignition coil 19 and other elements (not shown) are effectively connected in circuit to enable normal operation of the vehicle; and an alternate position on a contact 1b in which the igntion is cut off but certain components (e.g. the car radio) can still receive current. The contact 1b is connected via a lead 15b to the winding of a relay 15a whose armature acts as a circuit breaker in a connection 14 which extends from the make contact 13 of reversing armature 11 via a driver-operated manual switch 15 to the right-hand bank contact R of the selector switch 8 controlling the directional lights.

In the normal operation of the vehicle (ignition switch 1 in its operative position engaging contact 1a) the illustrated circuit arrangement works in the conventional manner to blink either the lights 9, 9' or the lights 10, 10' if the selector switch 8 is moved from its neutral position either onto contact L or onto contact R. In this event the passage of a relatively weak initial current through the resistance wire 4, insufficient to bring about the lighting of the selected directional signal lamp, causes this wire to lengthen until the spring 3 makes with contact 3a and shortcircuits the wire 4, thereby increasing the current flow so that the lamp is lit and the relay coil 6 in series therewith is effectively energized. Armature 11 is thereupon attracted onto its front contact 11a to light the monitoring lamp 12 on the dashboard in step with the selected signal lamp. As the short-circuited wire 4 cools again, its length decreases sufficiently to pull the spring 3 away from its contact 3a so that the aforedescribed condition of reduced current flow is re-established, the armature 11 dropping back onto its contact 13. In this manner the lamps 9, 9' or 10, 10' are periodically energized, together with lamp 12, to give the desired directional indication as is well known per se. With the manual switch 15 assumed to be open, the alternate energizing circuit 14 for the lamps 10, 10' remains inoperative.

If the driver wishes to indicate an abnormal condition, he throws the ignition switch 1 into its alternate position on contact 1b so that the ignition coil 19 is disconnected from battery B and the engine of the vehicle is cut off. He thereupon closes the switch 15 and moves the selector switch 8 into the left-hand position thereof, thereby initiating the aforedescribed intermittent operation of directional lights 9 and 9'. The reversal of ignition switch 1 having resulted in the energization of relay 15a via connection 15b, the alternate circuit 14 for the operation of right-hand lights 10 and 10' is now completed whenever the armature 11 of interrupter 2 rests on its back contact 13. Thus, the two sets of directional lights 9, 9' and 10, 10' operate intermittently, the lamp 12 being also lit in step with the left-hand lights 9, 9'. Should the driver elect to turn the switch 8 into its right-hand position under these conditions, an almost continuous energization of lamps 10 and 10' (with only brief periodic interruptions from the time when the spring 3 leaves its contact 3a to the instant when armature 11 falls back on its contact 13) would result.

Should the driver accidentally close the switch 15 during normal operation of the vehicle, the selector switch 8 would still control the directional lights 9, 9' or 10, 10' in the normal manner since the alternate circuit 14 would remain open at the contacts of relay 15a.

FIG. 2 shows a modification of the system previously described in that the ignition switch 1 connects battery B to the interrupter 2 (via fuse 23) only when on its opearting contact 1a, this contact being tied to the ignition coil 19 via a conductor 18 whose continuity is normally established by an armature 17 of a manual control switch 20. Another armature 16 of the same switch normally breaks the alternate circuit 14 to selector contact R, armature 16 thus combining the function of switch 15 and relay 15a in the preceding embodiment. It will be apparent that, in the system of FIG. 2, the emergency signal can be given only with the ignition switch 1 on its contact 1a and the manual switch 20 moved into its off-normal position whereby the ignition coil 19 is positively disconnected from its power source B and the engine is cut off.

If the conductor 15b of FIG. 1 were connected to contact 1a instead of contact 1b of the ignition switch 1, the same mode of operation would ensue, provided that the relay 15a were arranged to open its contacts in its energized rather than its quiescent condition. This has been illustrated in FIG. 3 where a relay 115a attracts its armature to open the circuit 114 when the ignition switch 1 is on its operating contact 1a connected to the winding of this relay via a conductor 115b. Circuit 114 also includes an armature 115' of a manual control switch 115 which replaces the switch 15 of FIG. 1; another armature 115'' connects the conductor 7, which leads to the selector switch 8, directly with the contact L of that selector switch when the control switch 115 is actuated, thereby eliminating the need for a separate operation of switch 8. It will be apparent that, again, the alternate blinking of the directional lights can be accomplished only when the switch 1 is removed from its operative position so as to de-energize the ignition coil. If control switch 115 were actuated inadvertently with the ignition switch 1a in its illustrated position, the result would merely be a blinking of the left-hand directional lights as in the case of left-hand displacement of selector switch 8. This operation of the directional lights would, of course, be made apparent to the driver by the flashing of monitoring lamp 12.

The systems described and illustrated are, of course, capable of numerous modifications without departing from the spirit and scope of the invention as defined in the appended claims.

We claim:

1. A signaling system for automotive vehicles and the like, comprising a source of current, a first and a second directional light, circuit means including a selector switch alternately movable from a neutral position to a first and a second working position for operatively connecting said source to said first and second lights, respectively, said circuit means further including periodically operable interrupter means adapted to energize the selected light intermittently, thereby causing the selected light to blink, conductor means forming an alternate energizing circuit for said first light, a normally open control switch in said alternate circuit, and switchover contacts coupled with said interrupter means for completing said alternate circuit in the nonenergizing condition of said interrupter means and upon closure of said control switch, thereby causing alternate blinking of said lights upon a displacement of said selector switch into said second working position for iterative operation of said interruptor means.

2. In an automotive vehicle having a source of current, ignition means and driver-controlled switch means for connecting said source to said ignition means, the combination therewith of a first and a second directional light, circuit means including a selector switch alternately movable from a neutral position to a first and a second working position for operatively connecting said source to said first and second lights, respectively, said circuit means further including periodically operable interrupter means adapted to energize the selected light intermittently, thereby causing the selected light to blink, conductor means leading to said source for forming an alternate energizing circuit for said first light, protective means including circuit-breaker contacts controlled by said switch means for normally keeping said alternate circuit open, and switchover contacts coupled with said interrupter means for completing said alternate circuit in the non-energizing condition of said interrupter means and upon inactivation of said protective means, thereby causing alternate blinking of said lights upon a displacement of said selector switch into said second working position for iterative operation of said interrupter means.

3. In an automotive vehicle having a source of current, ignition means, driver-controlled switch means for connecting said source to said ignition means, a first and a second directional light, circuit means including a selector switch alternately movable from a neutral position to a first and a second working position for operatively connecting said source to said first and second lights, respectively, said circuit means further including periodically operable interrupter means in series with said selector switch adapted to energize the selected light intermittently, thereby causing the selected light to blink, a monitoring lamp, and circuit-closing means controlled by said interrupter means for periodically energizing said lamp in step with the selected light, the combination therewith of conductor means leading to said source for forming an alternate energizing circuit for said first light, protective means including circuit-breaker contacts controlled by said switch means for normally keeping said alternate circuit open, and contact means periodically closable by said circuit-closing means for completing said alternate circuit in the non-energizing condition of said interrupter means and upon inactivation of said protective means, thereby causing alternate blinking of said lights upon a displacement of said selector switch into said second working position for iterative operation of said interruptor means.

4. The combination defined in claim 3 wherein said driver-controlled switch means includes an ignition switch for energizing and de-energizing said ignition means in an ON position and an OFF position, respectively, said protective means including relay means operable to hold said circuit-breaker contacts open in said ON position of said ignition switch.

5. The combination defined in claim 4 wherein said protective means further includes normally open manual contacts in series with said circuit-breaker contacts.

6. The combination defined in claim 3 wherein said driver-controlled switch means includes an ignition switch and normally closed contacts in series therewith said normally closed contacts being mechanically coupled with said circuit-breaker contacts for joint manual operation whereby said circuit-breaker contacts are closed only upon an opening of said normally closed contacts.

References Cited by the Examiner

UNITED STATES PATENTS

| | | | |
|---|---|---|---|
| 2,458,323 | 1/1949 | Volker | 340—55 |
| 2,655,642 | 10/1953 | Ayres et al. | 340—55 |
| 2,692,981 | 10/1954 | Hollins | 340—81 |
| 2,876,432 | 3/1959 | Gordon et al. | 340—74 |

NEIL C. READ, *Primary Examiner.*

T. A. ROBINSON, *Assistant Examiner.*